United States Patent [19]
Fretwell et al.

[11] Patent Number: 5,556,250
[45] Date of Patent: Sep. 17, 1996

[54] VEHICLE LIFTS

[75] Inventors: Percy Fretwell, Bury, England; Stanton D. Saucier, Tarzana; Bernard G. Doucet, Woodland Hills, both of Calif.

[73] Assignee: Ricon Corporation, Pacoima, Calif.

[21] Appl. No.: 449,777

[22] Filed: May 24, 1995

Related U.S. Application Data

[63] Continuation of Ser. No. 67,724, May 26, 1993, abandoned, which is a continuation-in-part of Ser. No. 681,542, May 3, 1991, Pat. No. 5,253,973.

[51] Int. Cl.$^6$ ........................................ B60P 1/44
[52] U.S. Cl. .................... 414/558; 414/917; 414/549
[58] Field of Search .................... 414/539, 540, 414/541, 542, 545, 546, 549, 558, 749, 695.7, 921, 917, 554, 557, 560, 550, 462, 522, 742, 728; 254/10 R, 10 B, 10 C; 901/46, 47

[56] References Cited

U.S. PATENT DOCUMENTS

| Re. 30,462 | 12/1980 | Pohl . |
| 2,391,813 | 12/1945 | Wood . |
| 2,457,380 | 12/1948 | Kelberer . |
| 2,774,494 | 12/1956 | Malmstrom . |
| 2,785,807 | 3/1957 | Prowinsky . |
| 3,490,622 | 1/1970 | Brackin ...................... 414/542 |
| 3,498,481 | 3/1970 | Size . |
| 4,058,228 | 11/1977 | Hall . |
| 4,134,504 | 1/1979 | Salas et al. . |
| 4,325,668 | 4/1982 | Julian et al. . |
| 4,466,771 | 8/1984 | Thorley et al. . |
| 4,484,851 | 11/1984 | Gottlieb et al. ................ 414/549 X |
| 4,579,503 | 4/1986 | Disque . |
| 4,685,860 | 8/1987 | McFarland . |
| 4,711,613 | 12/1987 | Fretwell . |
| 4,880,347 | 11/1989 | Lombard . |
| 4,909,700 | 3/1990 | Fonteccio et al. . |
| 4,958,979 | 9/1990 | Svensson . |

FOREIGN PATENT DOCUMENTS

| 0049582 | 4/1982 | European Pat. Off. . |
| 0078065 | 5/1983 | European Pat. Off. . |
| 0217467 | 4/1987 | European Pat. Off. . |
| 2541206 | 8/1984 | France . |
| 3531853 | 3/1987 | Germany . |
| 426507 | 6/1967 | Switzerland . |
| 1027999 | 5/1966 | United Kingdom . |
| 1226489 | 3/1971 | United Kingdom . |
| 2107671 | 5/1983 | United Kingdom . |
| 2135275 | 8/1984 | United Kingdom . |
| 8803484 | 5/1988 | WIPO . |
| WO88/03484 | 5/1988 | WIPO . |
| WO90/05072 | 5/1990 | WIPO . |

Primary Examiner—Frank E. Werner
Attorney, Agent, or Firm—Darby & Darby P.C.

[57] ABSTRACT

A vehicle lift, as for wheelchairs, incorporates a horizontally disposed load platform pivotally affixed to a laterally spaced-apart parallelogram elevating frame which is in turn pivotally affixed to a carriage, allowing a composite travelling assembly (platform, elevating frame and carriage) to be stowed in a mounting enclosure. A hydraulic ram actuates the parallelogram elevating frame mechanisms to position the platform at different terminal positions. At the stowing level, a pair of laterally spaced-apart rack-and-pinion mechanisms actuate the aligned platform, elevating frame and carriage inboard, on laterally opposed guide rails to be stowed in a mounting enclosure. A roll stop mechanism is affixed to the outboard end of the platform and is automatically actuated to move from a ramp position at ground level to a vertical safety stop position when the platform is elevated. A bridge plate mechanism is affixed to the inboard end of the platform to bridge the gap between the platform and the vehicle at vehicle floor level yet function as a vertical safety barrier at all other platform positions. A hinged handrail is fitted to each side of the platform for passenger safety.

24 Claims, 8 Drawing Sheets

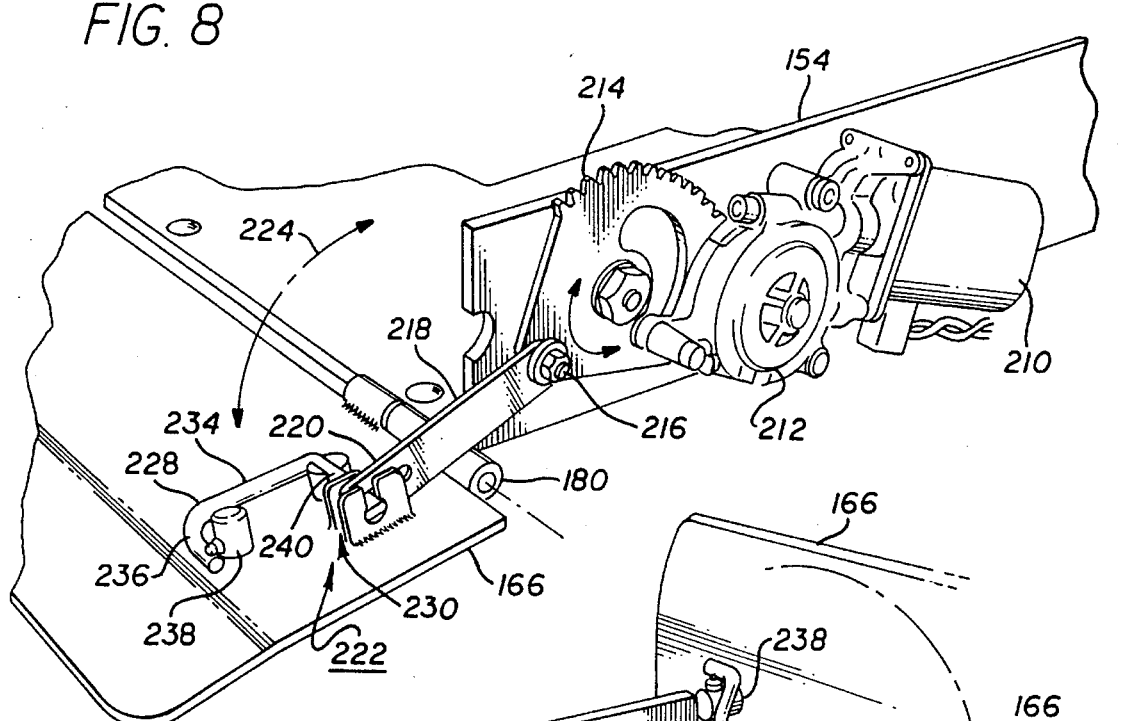
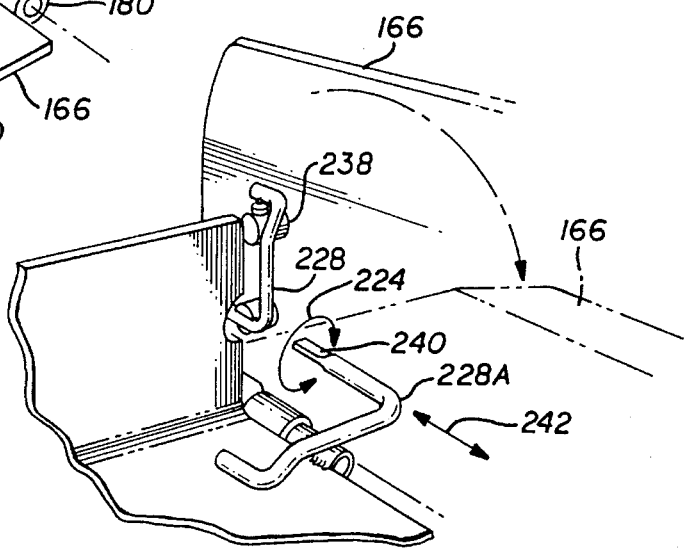
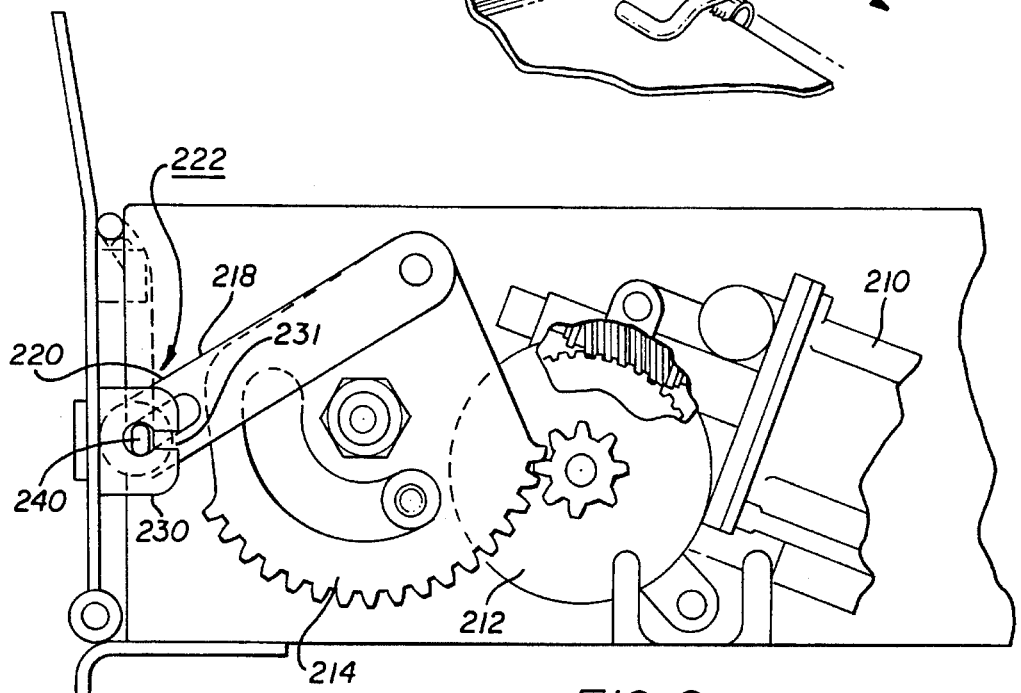

VEHICLE LIFTS

FIELD OF THE INVENTION

This invention relates to vehicle passenger lifts and more specifically to lifts used for the dignified boarding and disembarking of passengers who are handicapped and may be confined to wheelchairs.

RELATED CASES

This is a continuation of U.S. patent application entitled "Vehicles and Vehicle Lifts," Ser. No. 08/067,724, filed May 26, 1993, now abandoned which is a continuation in part of the U.S. patent application entitled "Vehicles and Vehicle Lifts," Ser. No. 07/681,542, filed in the United States on May 3, 1991, now issued as U.S. Pat. No. 5,253,973 on Oct. 19, 1993.

BACKGROUND AND SUMMARY OF THE INVENTION

Somewhat concurrently with a growing concern for handicapped persons, improved structures have been proposed for accommodating people either in wheelchairs or otherwise having limited mobility. In that regard, moving an occupied wheelchair in and out of a vehicle has presented one of the more challenging problems of attaining mobility for handicapped persons.

Generally, considerations relative to an effective wheelchair lift have included safety, ease of use, economy, space requirements and durability. Although a variety of mechanisms and structures have been proposed, a need has persisted for an improved lift to transport persons in wheelchairs in and out of vehicles.

One form of previously proposed wheelchair lift included a platform carriage, horizontally moveable between a stowed position within a vehicle and a deployed position outboard of the vehicle. A platform, in the carriage, was mounted to swing in an arcuate path for lifting and lowering a wheelchair between ground level and the floor level of the vehicle. As an example of such lifts, see U.S. Pat. No. 4,134,504, to Salas, et al. Generally, the system of the present invention is directed to wheelchair lifts of such a class or category, i.e., a horizontally stowable carriage with pivotal platform.

In the past, lifts as described above have been useful and effective; however, as indicated, the need for improvement has persisted. For example, it is important to provide a horizontally moveable mechanism that is capable of smooth motion without binding or catching between the stowage and deployed positions. As a further consideration, effectively aligning the platform for stowage is important as is providing a control system that is somewhat foolproof. Additionally, safety, economy and durability remain significant considerations with regard to an improved lift.

In general, a lift in accordance herewith includes a travelling assembly comprising a carriage, an elevating frame and a platform, horizontally moveable relative to a vehicle between inner (stowed) and outer (deployed) positions. A mounting enclosure, attached to a vehicle receives the travelling assembly. As part of the travelling assembly, a parallelogram lifting arrangement, including pivotal connections is fixed between the platform and the carriage. Drive or motive means raise and lower the platform as it travels an arcuate path. Specifically, as disclosed, the motive means is connected to the parallelogram elements connected to the upper pivot.

As a further aspect of the disclosed embodiment, the spaced-apart guide rails may be curved or incorporate an angle so that the travelling unit changes its orientation as it moves between inner and outer positions. Also, the parallelogram mechanism may be modified to change the inclination of the platform as it is raised or lowered. That is, when the platform is raised or lowered by a modified or irregular parallelogram, the inclination of the platform changes with reference to the horizontal. This is believed to be a unique safety feature.

In another aspect, the invention provides a vehicle lift including a travelling assembly moveable on lateral rails each comprising an elongate guide rail spaced from a support and engageable by cam followers. The system accordingly provides a lift for passengers who may be in wheelchairs, to be used with a vehicle, comprising a travelling assembly moveable in relation to a vehicle between inner and outer positions and including: a platform, an elevating frame and a carriage. The travelling assembly is received for stowage in a mounting enclosure.

The invention further provides a lift that may be effectively mounted beneath the floor of a vehicle, substantially without offending protrusions when stowed, and including a platform moveable between retracted (stowed) and extended (deployed) positions, the platform in the extended position being further moveable in an arcuate path between lower and raised positions to carry a load, i.e., a person in a wheelchair between ground level and the vehicle floor level.

BRIEF DESCRIPTION OF THE DRAWINGS

Recognizing that the invention may be variously embodied, by way of example, a specific embodiment along with some modifications is described herein with reference to the accompanying drawings, in which:

FIG. 8 is an enlarged fragmentary perspective view of a powered mechanism for operating the roll stop of FIG. 1 showing the roll stop in the ramp position;

FIG. 9 is a vertical sectional view of the mechanism of FIG. 8 showing the roll stop in the vertical safety stop position;

FIG. 10 is an enlarged fragmentary perspective of an emergency release device to disconnect the powered mechanism as showing in FIG. 8 to permit manual operation;

DETAILED DESCRIPTION OF DISCLOSED EMBODIMENT

Figure 1:
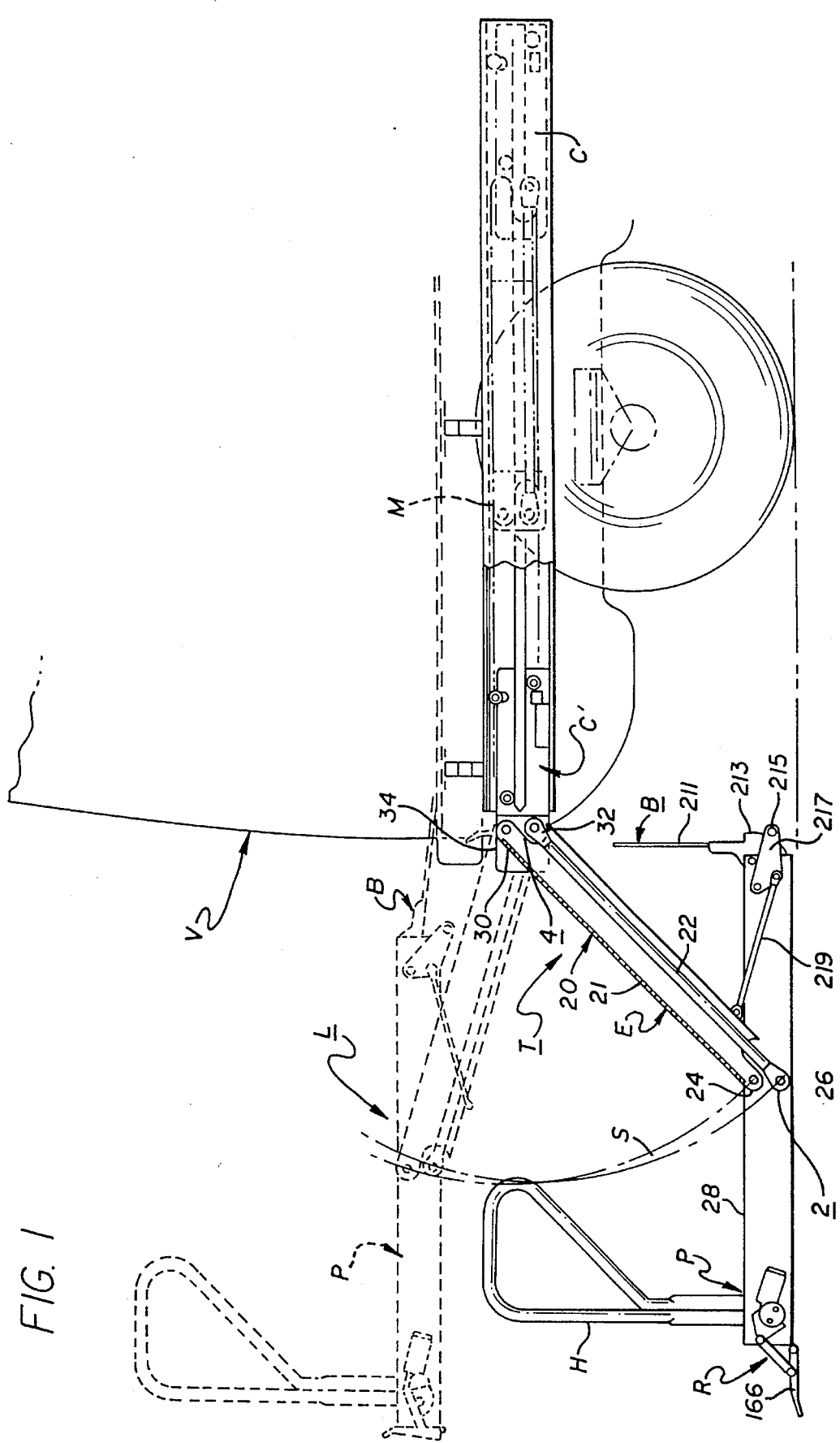
FIG. 1 is a simplified side elevation view of a vehicle incorporating a lift in accordance herewith and showing the lift in various operating positions.

In FIG. 1, a van type vehicle V is illustrated with a lift L mounted at the rear beneath the traditional access doors (not shown). Only the primary components of the lift L are shown in FIG. 1 with principle moving components being illustrated in different terminal positions, some of which are designated in dashed lines.

Generally, the lift L incorporates a platform P (lower left) shown in solid lines at ground level, for example, to receive or offload a wheelchair (not shown). The platform P is pivotally connected to an elevating frame E which is in turn pivotally connected to a carriage C. With the carriage C supported by the mounting enclosure M, the elevating frame E may be actuated to swing the platform P in an arcuate path S from the position shown in solid lines to a raised position indicated in dashed lines. From the raised position, approximating the floor level of the vehicle V, a wheelchair can be rolled into and out of the vehicle V.

The platform P, along with the elevating frame E and the carriage C is moveable horizontally as a travelling assembly T (FIG. 2) with respect to the vehicle V to be deployed for use or stowed in a mounting enclosure M. That is, from an intermediate aligned position in the arcuate path S of the platform P, the travelling assembly T moves horizontally into a stowage position. In FIG. 1, to illustrate the stowage or stowed position, the carriage C is shown in its operating position in solid lines as carriage C' with the mounting enclosure M cut away. The carriage C also is shown in dashed lines as it is positioned when the travelling assembly T is fully stowed.

Summarizing, the platform P (FIG. 1) moves in the arcuate path S to embrace three terminal positions, i.e., ground level (lowered), vehicle floor level (raised) and stowage level (intermediate). From the stowage level, the aligned platform P, along with the elevating frame E and the carriage C, moves as the composite travelling assembly T (FIG. 2) horizontally between an outboard deployed position and an inboard stowed position.

Figure 2:
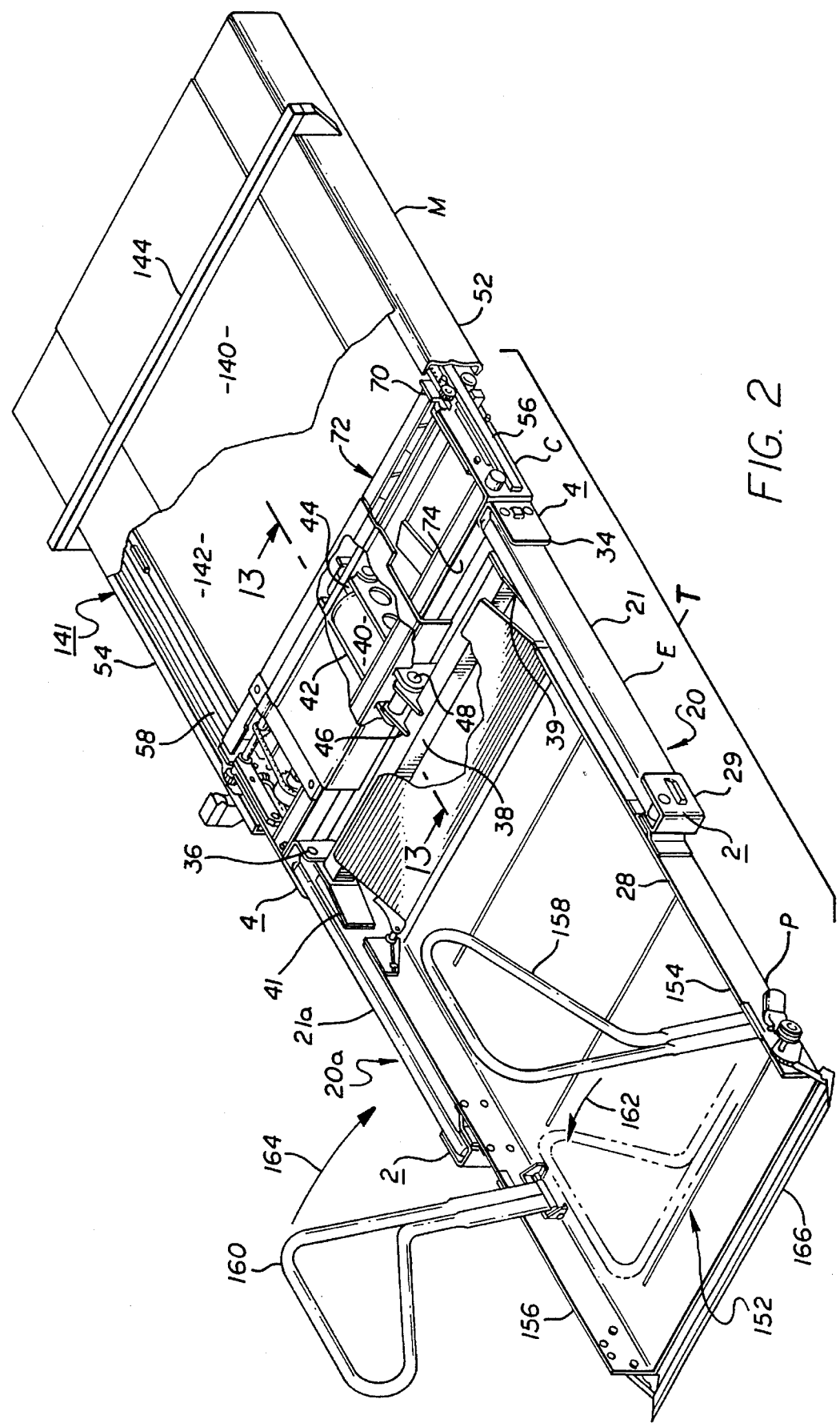
FIG. 2 is a detailed perspective view showing the lift of FIG. 1 aligned for stowage.

Considering FIGS. 1 and 2 somewhat concurrently, the elevating frame E extends between lateral outboard pivot locations 2 (sides of the platform P) and inboard pivot locations 4 on the carriage C. As part of the elevating frame E, two similar such laterally opposed parallelogram arrangements 20 and 20A (FIG. 2) are pivotally connected at opposite sides of the platform P.

As illustrated in FIG. 1, the parallelogram arrangements 20 and 20A each comprise upper and lower parallel elements. Consider the parallelogram arrangement 20 as exemplary. One parallel element, in the form of an elongate open channel 21 houses the other parallel elongate rod 22 (FIG. 1). The outboard ends 24 and 26 of the channel 21 and rod 22 are pivotally affixed to a lateral riser 28 (FIG. 2) of the platform P by a yoke 29. Somewhat similarly, the inboard ends 30 and 32 (FIG. 1) of the channel 21 and the rod 22 are connected to the carriage C by a yoke 34 (FIG. 2). Note that the parallelogram arrangement 20A (FIG. 2) at the opposite side of the platform P is a mirror image of the parallelogram arrangement 20.

The operation and structure of the parallelogram arrangements 20 and 20A are similar. In that regard, it is to be noted that the channel 21 (FIG. 2, arrangement 20) encloses the rod 22 on three sides throughout the complete path S of motion. Thus, as a safety feature, no gaps exist between these elongate swinging elements that otherwise might present a hazard.

To pivotally actuate the elevating frame E, for lowering and raising the platform P, a cross bar 38 (FIG. 2) extends transversely, offset from the aligned pivot locations 4. The bar 38 is rigidly affixed between the channels 21 and 21A by foundation supports 39 and 41 respectively. One end of a hydraulic piston-cylinder ram 40 (FIG. 2) is pivotally anchored centrally between support plates 42 and 44. The other end of the piston cylinder ram 40 is pivotally anchored to the bar 38 by means of the bracket 46 at pivot point 47 (FIG. 13) which is offset from the pivot point 48. When powered, the ram 40 actuates at pivot point 47 to drive the parallelogram arrangements 20 and 20A (ends 30, FIG. 1) to raise the elevating frame E in the arcuate path S while the platform P is preserved substantially horizontal.

The lifting and lowering operations are considered below in substantial detail, however, at this point it will be apparent that the arcuate path S (FIG. 1) of the platform embraces lowered, raised and stowage positions for the platform P. Generally, with the platform P in the lowered position (solid lines, FIG. 1) the roll stop R has been actuated to the ramp position to provide a smooth transition surface, as for loading a wheelchair. With a wheelchair on the platform P, the elevating frame E raises the platform P to the floor level of the vehicle V (dashed lines, FIG. 1). As the platform P reaches vehicle floor level, the bridge plate B lowers automatically and the wheelchair may be rolled into the vehicle V. Thereafter, the platform P is lowered to the stowage position of the aligned travelling assembly T (FIG. 2).

As indicated above, in the arcuate path S of the platform P, a stowage position exists intermediate the raised and lowered positions. Essentially, in the stowage position (FIG. 2) the platform P is horizontally aligned with the elevating frame E, the carriage C and the mounting enclosure M as illustrated in FIG. 2, allowing the platform P and the elevating frame E to travel in and out of the mounting enclosure M by means of carriage C. Essentially, the travelling assembly T moves somewhat horizontally between a stowed position within the van V (see carriage C, dashed lines, FIG. 1) and an outboard deployed position with only the carriage C remaining within the van V. As disclosed herein, the movement of the travelling assembly T between the stowed and deployed positions is powered, which operation will be considered along with the related mechanisms.

Figure 3:
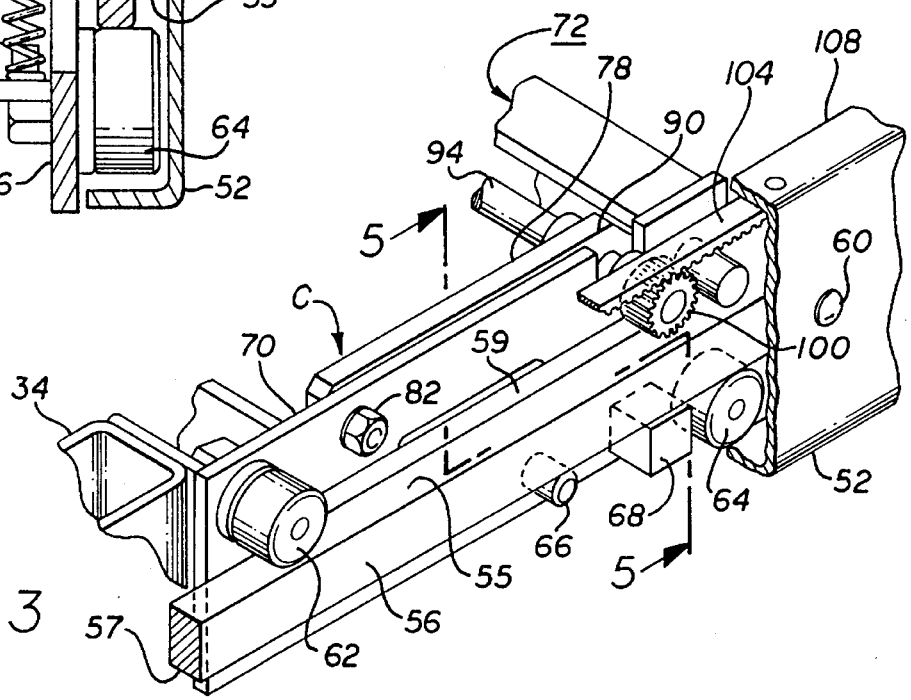
FIG. 3 is an enlarged partially cut-away and fragmentary perspective view of a portion of the lift as illustrated in FIG. 2.

As indicated above, the platform P (FIG. 2) along with the elevating frame E and the carriage C move as the travelling assembly T into the mounting enclosure M. Specifically, a pair of open, facing opposed horizontal channels 52 and 54 (FIG. 2) are affixed to the vehicle V and mount the elongate aligned guide rails 56 and 58 respectively as also shown in FIG. 3. That is, FIG. 3 shows the (cut-away) channel 52 supported by the vehicle V open to face the opposed channel 54. As the channels 52 and 54 are similar (mirror images) only the channel 52 and associated structure will be described in detail as representative.

Figure 5:
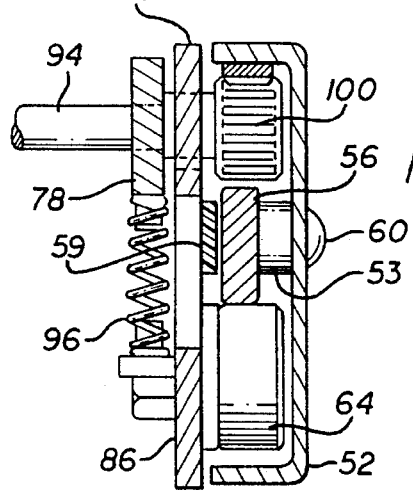
FIG. 5 is a vertical sectional view taken along the line 5—5 of FIG. 3.

The bar or rail 56 is of rectangular cross section to define upper and lower rail surfaces 55 and 57 and is centrally affixed in the channel 52 coextensive therewith. Various fastening techniques may be employed; however, as illustrated in FIG. 5, the guide rail or bar 56 is affixed to the channel 52 by threaded studs 60 tapped into the rail 56. Consequently, the channel 52 and the bar 56 are rigid affording a linear bearing track to support the carriage C by means of cam followers. The studs 60 pass through standoff bushes 53 laterally spacing the guide rail 56 from the channel 52. Also, a nylon spacer guide 59 is affixed to the side plate 70 (FIG. 5) of the carriage C. The objective of this structure or attachment is to avoid the accumulation of foreign matter that may otherwise build up and interfere with the smooth motion of the cam followers 62 and 64 on surfaces 55 and 57.

Further in relation to the structure as shown in FIG. 3, a stop block 68 is attached to the side plate 70 of the carriage c, along with a switch operating plunger 66. These elements mate with another angled stop block (not shown) attached to the channel 52 when the travelling assembly is in the deployed position. The plunger 66 is integrated with the electrical system (described below) as the primary control for the up-and-down movement of the platform P.

Figure 4:
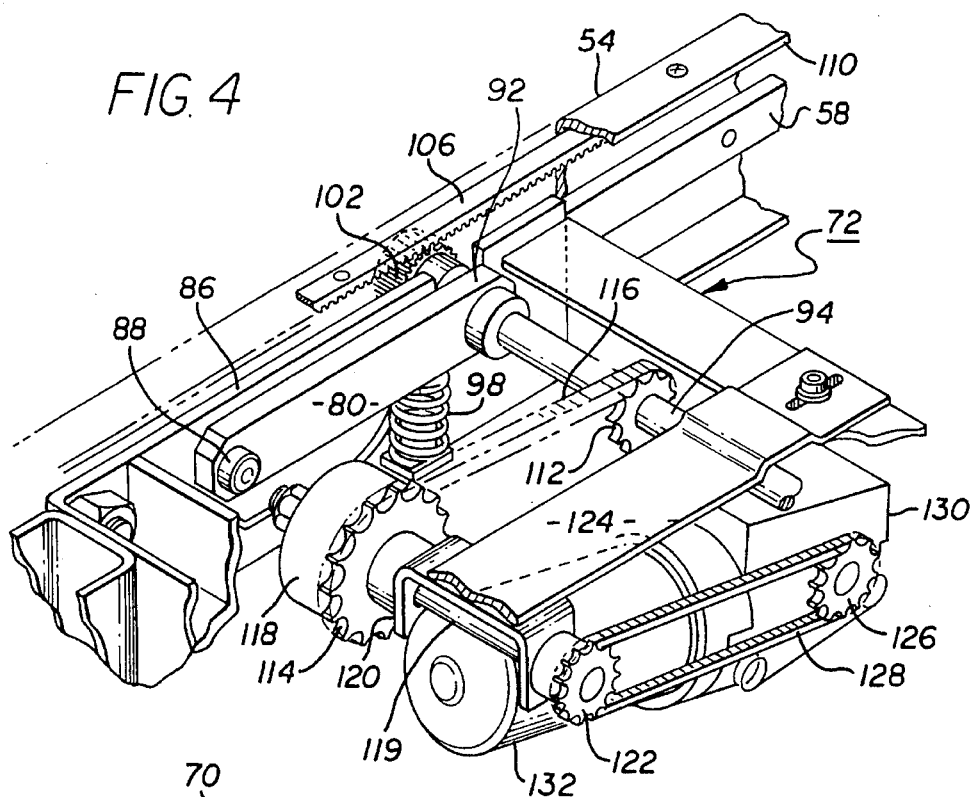
FIG. 4 is another enlarged partially cut-away and fragmentary perspective view of a portion of the lift as shown in FIG. 2.

The side plate 70 (FIG. 3) of the frame 72 also carries an internally mounted arm 78 pivotally supported to swing vertically on a bearing fitted to a bolt 82. A similar arm 80 (FIG. 4) is mounted to side plate 86 by means of bearing on bolt 88. Mounted between the free swinging ends 90 and 92 (FIGS. 3 and 4) of the arms 78 and 80 respectively, is a deployment drive shaft 94 shown fragmentarily in both FIGS. 3 and 4. The shaft 94 is journaled to extend through the ends 90 and 92 of the arms 78 and 80 respectively. The vertically moveable ends 90 and 92 of the arms 78 and 80 are urged upwardly by a pair of coil springs 96 (FIG. 5) and 98 (FIG. 4). Thus, the shaft 94 is positioned to couple the carriage C for horizontal movement.

The shaft 94 extends outwardly from the arms 78 and 80 (FIGS. 3 and 4) passing through the plates 70 and 86 to support a pair of pinion gears 100 and 102 respectively. Fixed in the mounting enclosure channels 52 and 54, a pair of gear racks 104 and 106 engage the pinion gears 100 and 102 respectively. As illustrated in FIGS. 3 and 4, the racks 104 and 106 respectively are affixed inside the top webs 108 and 110 of the channels 52 and 54. Accordingly, as the shaft 94 is revolved, the pinion gears 100 and 102 engage the racks 104 and 106 to move the carriage C (FIG. 1) forwards and backwards within the mounting enclosure M.

Considering the power drive for the shaft 94, a sprocket 112 (FIG. 4) fixed concentrically on the shaft 94 is coupled to a sprocket 114 by a loop chain 116. The sprocket 114 is mechanically integrated with a ball-detent torque limit clutch 118 concentrically mounted with the sprocket 114 on a shaft 119. A yoke 120 supports the shaft 119 for rotation carrying the clutch 118 on one end and a sprocket 122 on the other. The yoke 120 is affixed, as by welding to an adjustable horizontal support bracket 124 mounted on the frame 72.

Considering the power drive further, the sprocket 122 is driven by a sprocket 126 through a chain 128. The sprocket 126 is mounted on a gear box 130 integrally supported with a motor 132. Thus, through the drive chains 128 and 116, the bi-directional motor 132 actuates the rotary shaft 94 to turn the pinions 100 and 102. Accordingly, engaging the racks 104 and 106, the pinions 100 and 102 move the travelling assembly T (FIG. 2) inward or outward with respect to the vehicle V (FIG. 1).

As indicated above, in stowage, the travelling assembly T is well contained in the mounting enclosure M. Essentially, the mounting enclosure M (FIG. 2) comprises a closed box 141 defined by the laterally spaced side channels 52 and 54, a top cover 140 (FIG. 2) and a vented bottom 142. Laterally extending brackets, as bracket 144, are bolted to the outer faces of channels 52 and 54 and are attached, as by bolting to the vehicle V. Thus, the mounting enclosure M effectively provides a means of attaching the lift assembly L to vehicle V as well as stowage space with the opposed guide rails 56 and 58 (FIG. 2) supportably engaging the carriage C. In that regard, the mechanism is void of traps for dirt or debris that otherwise might accumulate to foul the operation.

As another consideration relating to the disclosed lift L, is that, in association with the mounting enclosure M, the carriage C, the elevating frame E and the platform P essentially are modular units to facilitate relatively easy replacement. That is, in the event of a component failure, one of the modular units can be replaced thereby rapidly returning a vehicle to service. In that regard, the connection points are readily apparent.

Figure 6:
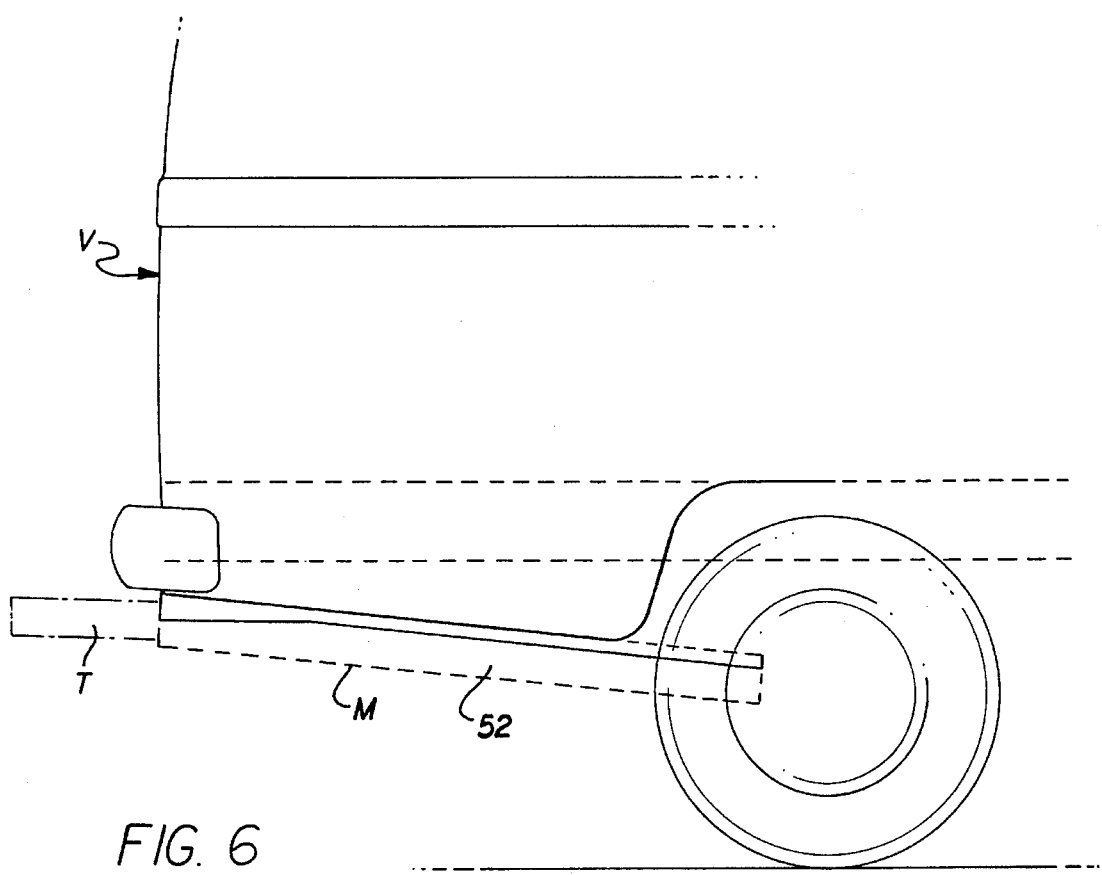
FIG. 6 is a side elevation view similar to FIG. 1 depicting an alternative embodiment.

If there is sufficient space beneath the vehicle, the mounting enclosure M can be horizontally mounted by means of channels 52 and 54 as described above. However, in some instances, the vehicle configuration may prevent such an arrangement. To accommodate an alternative mounting arrangement, the mounting enclosure M may be attached to vehicle V with an accommodating angle of departure as shown in FIG. 6. Essentially, the channels 52 and 54 (FIG. 2) can be mounted on the vehicle incorporating an angle as shown in FIG. 6, so as to be inclined upwards as they extend outward or rearward thereby placing the inner ends beneath components of the vehicle V. Essentially, when stowing the travelling assembly T, it follows the contour of a pair of angled guide rails 56 and 58 when moving into the mounting enclosure M.

Figure 7:
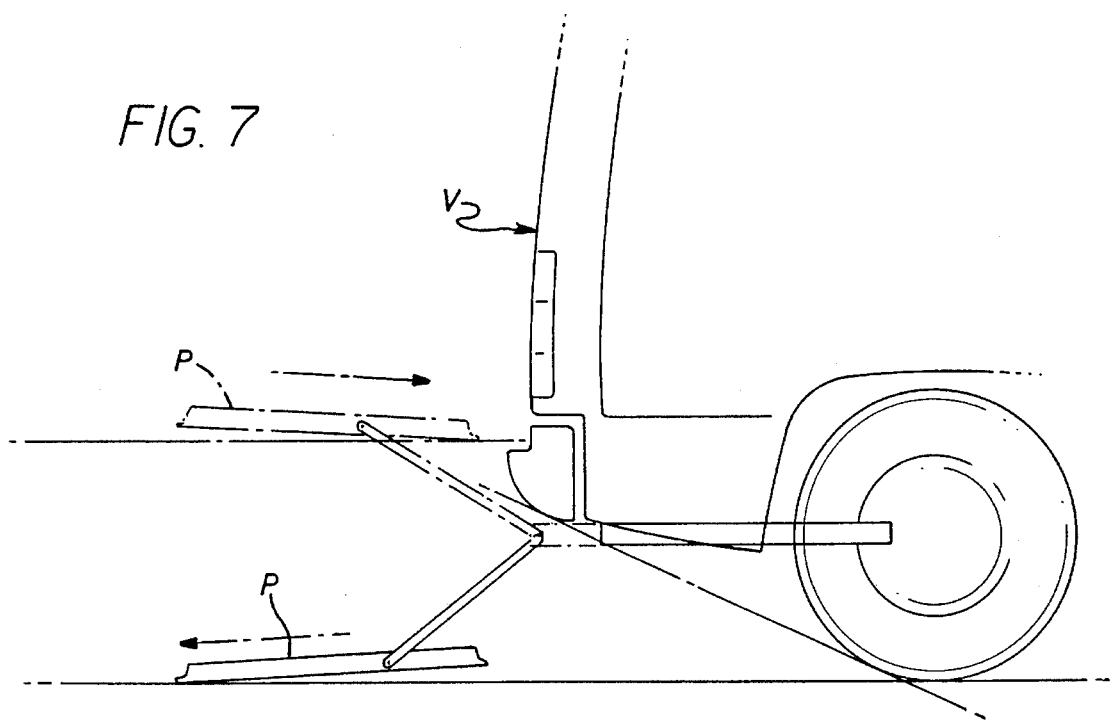
FIG. 7 is a side elevation view similar to FIG. 1 illustrating another alternative embodiment.

As another alternative, the parallelogram arrangements 20 and 20A (FIG. 1) of the elevating frame E can be modified to accomplish horizontal offsets by the platform P at different levels (FIG. 7). Specifically, the parallelogram arrangement 20 (FIG. 1) can be modified so that the separation between the pivot points 2 at outboard ends 24 and 26 is slightly greater (i.e., 2 mm.) than the separation between the pivot points 4 at the inboard ends 30 and 32. An unequal parallelogram is the result. Consequently, when the lift is in the lowered position (FIG. 7), the platform P inclines slightly downward as it extends outward. Conversely, when the platform P is elevated, it is inclined slightly upward as it extends outward. Accordingly, a safety feature is provided tilting the platform in a direction to accommodate the natural gravitational wheelchair motion depending upon whether the platform is raised or lowered.

Considering the structure of the platform P (FIG. 2) in somewhat greater detail, it comprises a horizontal flat platform surface 152 bounded by lateral risers 154 and 156. A pair of handrails 158 and 160 are pivotally affixed at the corners defined between the surface 152 and the risers 154 and 156. The handrails 158 and 160 swing about a horizontal axis parallel to the defined corners of risers 154 and 156. Accordingly, movement is accommodated as indicated by the arrows 162 and 164 allowing the handrails to be lowered to stowage positions (indicated in broken lines) or raised to extend vertically as safety guards. While the handrails 158 are effective safeguards for persons in wheelchairs, they are also very significant for mobility-impaired standing passengers, for example such persons may be using a walking aid.

The outboard and inboard ends of the platform P with respect to the vehicle V (FIG. 2) are terminated with a roll stop R and a bridge plate B which are actuated to provide a transition surface from the platform P either to ground level or to the vehicle floor. Different types of structures for the roll stop R and bridge plate B are practical in accordance herewith, however, specific embodiments are illustrated and explained below.

As shown at 166 (FIG. 1) the roll stop R at the outboard end of the platform P, is activated when the platform P is at ground level to provide smooth transition from the surface 152 of the platform P to the ground. When the platform P is elevated from the ground, the roll stop R automatically pivots from a lowered ramp position to a raised or vertical safety stop position functioning to retain the wheelchair on the surface 152. Various details of the roll stop R are illustrated in FIGS. 8 through 12.

In the disclosed embodiment, the roll stop R is powered to be in the locked vertical mode when the platform P is not in contact with the ground. A latch mechanism supplements the powered operation to provide an electrical safeguard, i.e., the lift cannot be operated until the roll stop is raised to the vertical safety stop position.

Figure 11:
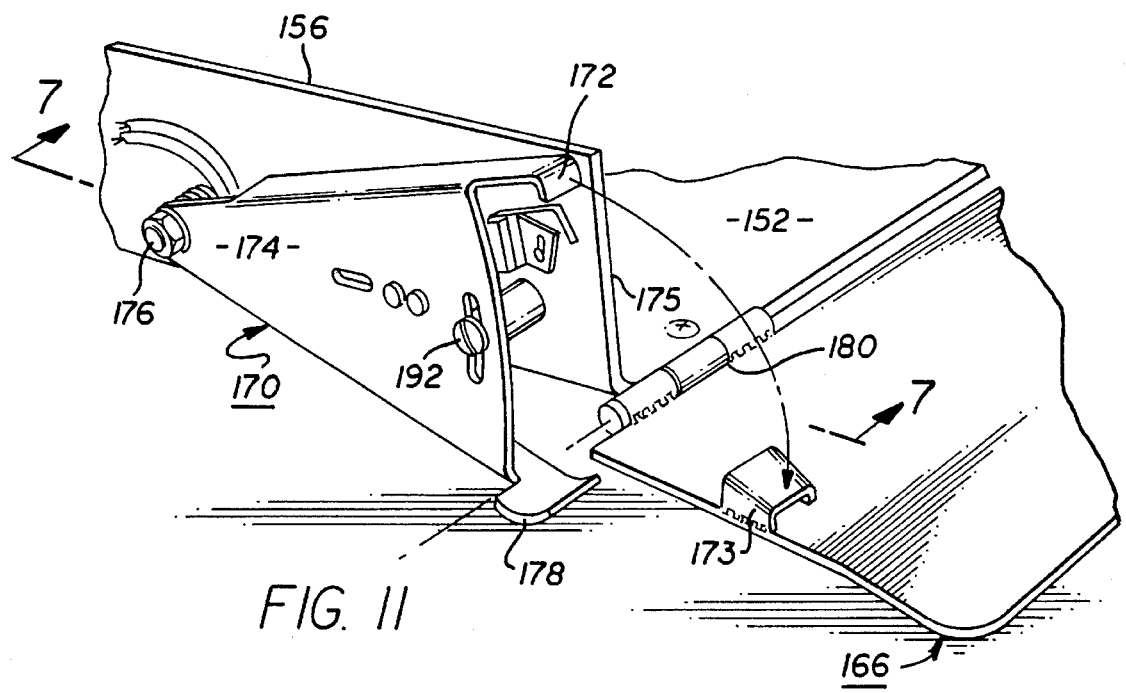
FIG. 11 is an enlarged fragmentary perspective view of the roll stop latch mechanism.
Figure 12:
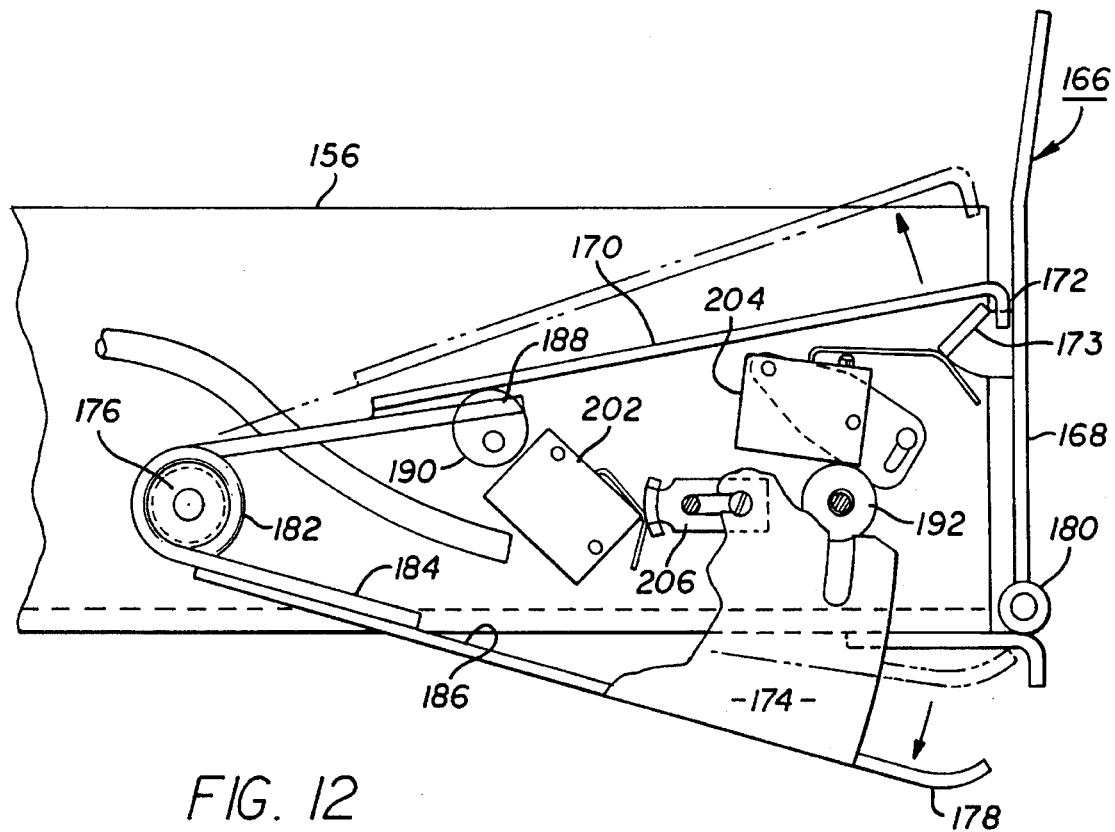
FIG. 12 is an enlarged fragmentary cut-away view of FIG. 11.

The roll stop R functions with the bridge plate B to provide a peripheral safety barrier to the platform surface 152. The bridge plate is mechanically activated by the motion of the elevating frame E and automatically provides a bridge between the platform P and the vehicle V. As described in detail below, it also functions as a vertical safety barrier at the inboard end of the platform P. Considering the roll stop R in greater detail, the roll stop 166 is powered by a motor-driven mechanism and supplemented by a latching mechanism (FIGS. 11 and 12). The power mechanism is fitted to one side of the roll stop 166 (FIGS. 8, 9 and 10) while the latch mechanism is fitted on the opposing side (FIGS. 11 and 12).

As illustrated in FIGS. 8 and 9, a motor 210 is coupled through a gear box 212 to a rotary quadrant gear 214 that also acts as a cam. The cam action of the quadrant gear 214 is by a pivot fastener 216 to reciprocate an arm 218. The opposed end 220 of the arm 218 (remote from the pivot fastener 216) terminates in a releasable pivot coupling 222.

Essentially, as the motor 210 turns the quadrant gear 214, the cam action of the gear 214 at the pivot fastener 216 reciprocates the arm 218 to open or close the roll stop 166 as indicated by an arrow 224. Note that the motor 210 is controlled by a switch 202 fitted in the latch mechanism (FIG. 12) that selects the operating position of the roll stop 166 as described in greater detail below. However, possible malfunction of the mechanism could lock the roll stop 166 in the raised vertical position presenting a serious problem. Consequently, a release is provided.

The releasable coupling 222 (FIGS. 8 and 10) incorporates a levered release pin 228 fixed to extend through the end 220 of the arm 218 along with a guide structure 230. From a key end 240 (FIG. 8) the pin 228 extends parallel to the hinges 180, then turns through an angle of ninety degrees to a lever section 234. The free end 236 of the lever section 234 is turned for snap lock engagement behind a post 238.

As indicated above, the need may arise to actuate the roll stop 166 when the motor 210, for one reason or another, is inoperative. Accordingly, the release pin 228 may be disengaged to release the end 220 of the arm 218 from the lock structure 230. The operation is illustrated in FIG. 10. Essentially, the end 236 of the pin 228 is released from the post 238 with a slight flexure to move through an angle of approximately ninety degrees, allowing a key end 240 (FIGS. 9 and 10) to pass from the guide structure 230 accommodated by a slot 231 (FIG. 9). In FIG. 10, the pin 228A is illustrated withdrawn from locking engagement. Thus, the locking and unlocking movements of the pin 228 simply involve a rotary motion indicated by the arrow 224 (FIG. 10) and a linear motion indicated by the arrow 242. With the pin 228 withdrawn, the roll stop 166 (FIG. 10) can be freely moved to either a raised (vertical) or lowered (ramp) position. With replacement of the pin 228, the raise and store functions are restored.

Returning to consider the latch mechanism (FIGS. 11 and 12) the roll stop 166 is hinged to the surface 152 and extends the full width of the platform P. When elevated, the roll stop 166 is locked in the vertical position by a latch mechanism 170 (FIG. 11). When the roll stop 166 is raised from the position illustrated in FIG. 11 (somewhat horizontal) to a raised position (vertical), a trigger 172 extending from the latch mechanism 170 drops into locking engagement with a staple 173.

To consider the structure of the roll stop 166 in greater detail, the latch mechanism 170 (FIG. 11) incorporates a triangular shaped housing 174 with an apex pivotally affixed to the riser 156 by a pivot bolt 176. From the pivot bolt 176, the housing 174 swings in a vertical plane whereby the trigger 172 may be engaged or disengaged with the staple 173 on the inside surface of the roll stop 166.

From the bottom of the housing 174, a ski 178 extends to engage the ground surface when the platform P is completely lowered. Such engagement lifts the housing 174, disengaging the trigger 172 from the staple 173 with the consequence that the roll stop 166 carried on hinges 180 is lowered by the power mechanism (FIGS. 8 and 9) to the illustrated ramp position (FIG. 11). Thereafter, when the wheelchair is in the desired position (either loaded or offloaded) the action of elevating the platform P returns the roll stop to its raised and locked position.

The housing 174 is biased downwardly by a spring 182 anchored at a point 190 and coiled about the pivot 176. Specifically, a lower end 184 of the spring 182 engages the bottom side 186 of the housing 174. The overall sequence of operation now will be considered.

As the platform P drops to the lowered position, the ski 178 engages the ground and is raised against the force of the spring 182 to a position indicated in broken lines (FIG. 12). Accordingly, the trigger 172 is withdrawn from the staple 173. As illustrated in FIG. 12, the actions of the latch mechanism control the operation of the power unit as described below in accordance with the switches 202 and 204. The switches 202 and 204 are mounted within the housing 174 for actuation respectively by a cam 206 and the staple 173. The switch 204 indicates that the roll stop 166 is locked in the vertical stop position whereas the switch 202 indicates when the platform is at ground level. Further details of the operation involving the switches 202 and 204 are treated in the section below addressing the electromechanical lift operation. However, generally it is noteworthy that the switch 202 controls the bi-directional operation of the motor 210 and the switch 204 totally isolates the up-and-down platform motion until the roll stop 166 is latched in the vertical stop position.

Turning now to the bridge plate mechanism B (FIG. 1) and its associated operation, a panel 211 is pivotally attached to the platform P by a cam bracket 213 actuated by a rotary mounted roller on a cross shaft 215 carried by a bracket 217 pivotally attached to the platform P. The bracket 217 is pivotally linked by a rod 219 to the arm 21 of the elevating frame E. A mirror image of these components is provided at the opposite end of the panel 211. The panel 211 is spring biased in the direction of the vehicle V maintaining contact between the roller 215 and its relative surface on the cam bracket 213. Accordingly, the vertical motion of the arm 20 acts through the rod 219 via the bracket 217 (cross shaft 215 and the bracket 213) to lower the panel 211 when the platform P is at vehicle floor level. At other times, the panel is held in a locked vertical position.

In the operating motion patterns of the lift, manual control is supplemented by electrical sensor switches. In addition to the switches explained above, other switches also indicate and control various other positions of the platform P. Such switches (FIGS. 13, 14 and 15) are carried on a plate 258 that is vertically fixed in the mounting frame 72 (FIG. 2).

Figure 14:
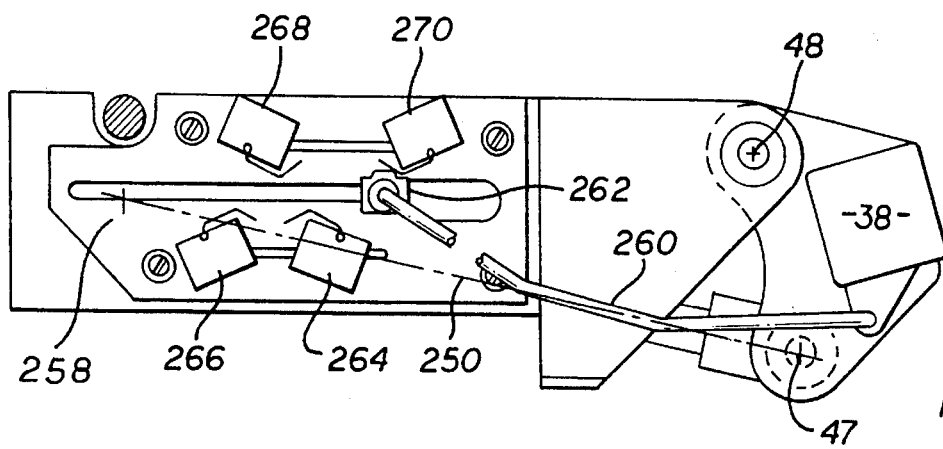
FIG. 14 is a sectional view similar to FIG. 13 showing a switch actuating cam position when platform is at vehicle floor level.
Figure 13:
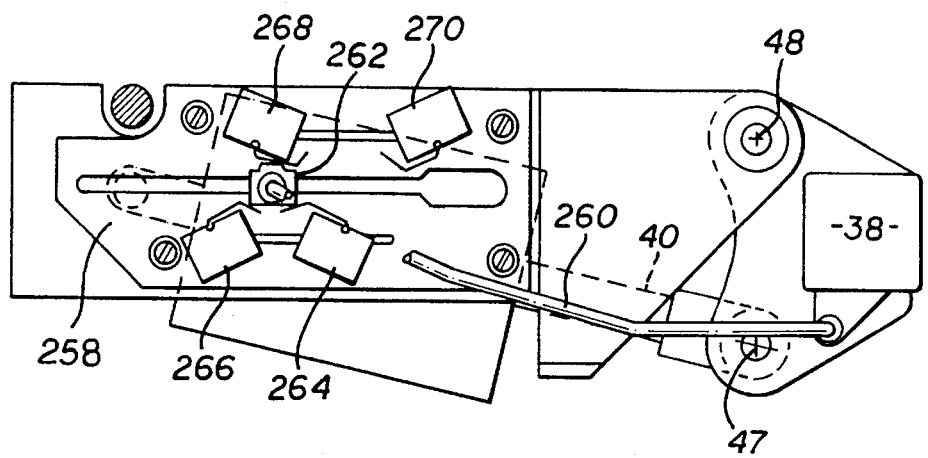
FIG. 13 is a horizontal sectional view taken along line 13—13 of FIG. 2 showing a switch actuating cam position when the platform is at stowing level.
Figure 15:
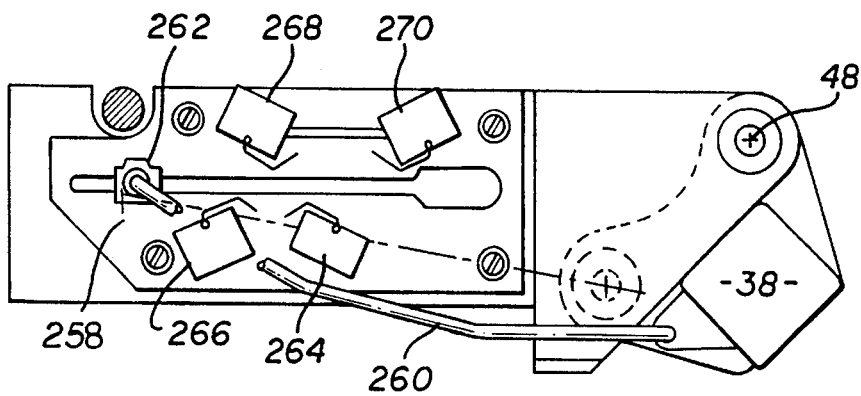
FIG. 15 is a sectional view similar to FIG. 13 showing a switch actuating cam position when platform is at ground level.

As the cross bar 38 is moved to actuate the parallelogram arrangement 20 (FIG. 1), a link 260 (FIG. 13, shown in cut-away) variously positions a linear cam 262. That is, when the cross bar 38 moves, as illustrated by FIGS. 14 and 15 to raise or lower the platform P, the link 260 variously positions the linear cam 262 to selectively close switches 264, 266, 268 and it opens 270.

The switch 270 is opened when the platform P attains the vehicle floor level position. The switch 268 is closed when the platform P approaches the stowage position. Functioning together, when the switch 268 is closed, the switches 264 and 266 set and maintain the platform P in the stowed position (travelling assembly T aligned, FIG. 2). The functions of the switches in relation to the overall system operation is treated in detail below.

Figure 16:
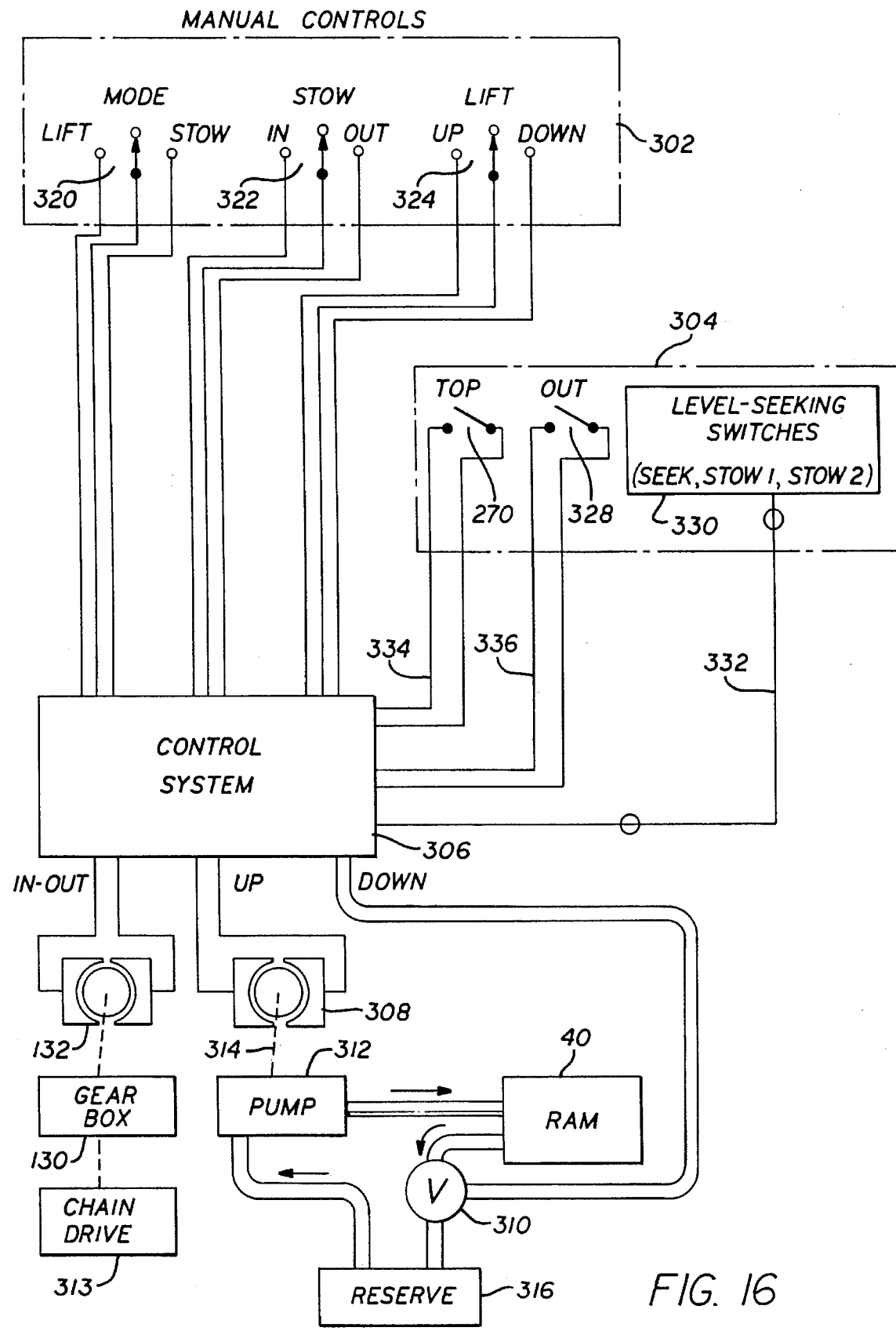
FIG. 16 is an electromechanical diagram of the drive system of the disclosed embodiment.

To consider the electrical-hydraulic system embodied in the lift of FIG. 1, reference will now be made to FIG. 16. Several of the schematically represented elements in FIG. 16 have been previously described in relation to the mechanical components. Such elements carry the same reference numerals. Otherwise, several other of the elements indicated in FIG. 16 are not apparent in the earlier drawings and have not been specifically mentioned.

Generally, the lift L provides a set of manual controls 302 along with a set of position switches 304, both of which are connected to a control system 306. Depending on the implementation of the electrical-hydraulic system, the control system 306 may be variously embodied; however, in one successful embodiment,, the system 306 comprises relays utilizing a control logic implemented as will be described below. Accordingly, the control system 306 selectively energizes various components to accomplish the operations as desired at different times. Specifically, the control system 306 selectively energizes the "in-out" motor 132, an "up" motor 308 and a "down" release valve 310.

Recapitulating to some extent, the "in-out" motor 132 is mechanically coupled to the gear box 130 (FIG. 4) which is in turn coupled to a chain drive 313 including chains 116 and 128. Accordingly, the motor 132 may be energized to revolve in either direction to move the travelling assembly T between deployed and stowed positions.

The "up" motor 308 (FIG. 16 only) is mechanically coupled to a pump 312 as indicated by a dashed line 314. When the pump is actuated by the motor, the pump 312 draws hydraulic fluid from a reservoir or reserve 316, forcing the fluid to extend the ram 40. As a result, the platform is lifted. When the platform P is to be lowered, the pump 312 is de-energized and the valve 310 is opened. Accordingly, the fluid in ram 40 is released, allowing it to flow back to the reserve 316. As a result, the platform P is gravitationally lowered under its own weight or with a load. A flow valve selectively controls the rate of descent.

As indicated above, manual controls 302 selectively control the various desired operations. Specifically, a single pole, double throw, mode switch 320 may be actuated to either "lift" or "stow" positions. A momentary-contact form of an otherwise similar switch 322 is actuated during stowing operations to move the travelling assembly T between deployed and stowed positions. A similar switch 324 controls lifting operations to move the platform "up" or "down". Contact terminals of all the controls including the switches 320, 322 and 324 are connected to the control system 306.

The control operations are supplemented by the set 304 of position switches. These switches are actuated mechanically as a result of certain operating positions of the lift structure. Note that the alternative embodiment with a powered roll stop (FIGS. 8, 9, 10, 11 and 12) is not treated in relation to FIG. 16 as it involves a change in circuitry.

When the platform P reaches the top of its path, a switch 270 is opened. Somewhat similarly, when travelling assembly T is fully out or deployed, a switch 328 is closed. A set 330 of switches (264, 266 and 268) are collectively represented as a block. The switch set 330 is connected to the control system 306 through a cable 332 while the switches 270 and 328 are connected to the system 306 through lines 334 and 336 respectively.

Generally, the logic of the control system 306 implements safe and effective manual operation of the lift. In that regard, power is supplied to the mode switch 320 for selecting the options of "lift" or "stow". In the "lift" mode, electrical current is routed to the "out" switch 328 and in the "stow" mode, current is directed to the level seeking switches 330.

For "lift" operation, the "lift" switch 324 is toggled right or left, causing the platform to move either "down" or "up", providing the "out" switch 328 is closed. Consequently, the platform may not be raised or lowered unless it is fully extended. So positioned, toggling the switch 324 to the "up" position raises the platform until the "top" switch 270 is opened. The "down" operation is enabled, simply by opening the valve 310.

When the mode switch 320 is in the "stow" position, the lift switch 324 is effective until the platform is positioned approximately at the stowage level. On that occurrence, the switch 268 (FIG. 13) is closed and the manual switch 324 becomes ineffective. The level-seeking switches 264, 266 and 268, collectively represented as the switches 330 in FIG. 16 assume control to align the travelling assembly T for stowage. Specifically, as the platform P approaches a position of alignment for stowage, the cam 262 (FIG. 13) closes the switch 268 commanding a "seek" operation. The switches 264 and 266 then assume control, moving the platform P as appropriate Until both of the switches 264 and 266 are closed. If the switch 264 is closed and the switch 266 is open, the platform will be moved, actuating the cam 262 to the left (as shown) until the switch 266 also is closed. Thus, the level seeking switches 330 (FIG. 16) attain and maintain alignment of the travelling assembly T for stowage. A master switch may be provided for the lift to enable the level seeking switches 330 to accomplish alignment before any other action.

Returning to the "stow" mode of operation, with the platform P aligned in the configuration of the travelling assembly T, the stow switch 322 is rendered operative for commanding "in" and "out" movements. Essentially, with the travelling assembly T aligned, the switch 322 may be toggled to move the travelling unit into a stowage position or outward to a deployed position. When the travelling unit is out, the switch 328 is closed so that when switch 320 is in the lift mode, up down switch 324 is enabled. When the travelling assembly T is fully "in" or "out", the detent clutch 118 (FIG. 4), yields sonically indicating the desired position has been attained. The motor 132 is bi-directional for actuating the chain drive 313 through the gear box 130 to move the travelling unit "in" and "out". The motor 308 actuates the pump 312 to extend the ram 40, lifting the platform P. Alternatively, with the pump 312 inactive, opening the valve 310 relieves the ram 40 so that the platform drops of its own weight as fluid is returned to the reserve 316.

In view of the above detailed descriptions, the structure of the exemplary embodiment as well as its operation, are deemed to be clearly explained. However, a cycle of operation will now be treated with selected reference to individual figures to summarize the overall performance. Accordingly, assume initially that the lift L is in a stowed position so that the platform P (FIG. 1) is aligned with other components in the travelling assembly T (FIG. 2). Also, the travelling assembly T is fully stowed in the mounting enclosure M (FIG. 1) well within the vehicle V as indicated in dashed lines in FIG. 1.

Further assume that the vehicle V is parked and it is desired to use the lift L for offloading an occupant in a wheelchair from the vehicle V. If a master switch (not shown) is provided, such a switch is closed to energize the electrical system. Immediately, the level seeking switches 330 (FIG. 16) are activated to correct any misalignment in the travelling unit T that may have occurred during stowage. The operation is automatic as explained in detail above with reference to FIGS. 13, 14, 15 and 16. The motor 132 is bi-directional for actuating the chain drive 116 through the gear box 130 to move the travelling unit "in" and "out".

With the travelling assembly T aligned (FIG. 2), the "stow" mode is selected by positioning the switch 320 (FIG. 16). Next, the "stow" switch 322 is toggled to an "out" position, energizing the motor 132 to drive the gear box 130 (FIG. 4), motivating the pinion gears 100 and 102 (FIGS. 4 and 5) to linearly travel on the racks 104 and 106 moving the travelling assembly T to a deployed position somewhat as illustrated in FIG. 2. When the travelling assembly T is fully extended, the clutch 118 (FIG. 4) audibly informs the operator to release the out switch, thereby de-energizing the motor 132.

The operator next places the mode switch 320 in the "lift" position. Toggling the lift switch 324 to the "up" position actuates the motor 308 and the pump 312 to drive the ram 40 (FIGS. 2 and 16). As the ram 40 extends, the cross bar 38 (FIGS. 2, 13, 14 and 15) moves in an arcuate pattern to raise the platform P to the elevated position as indicated in dashed lines in FIG. 1. With the platform so elevated, the bridge plate B (FIG. 1) inboard of the platform P is automatically lowered as illustrated in dashed lines.

The passenger in the vehicle V can now transfer to the platform P. Loaded, the lift switch 324 (FIG. 16) is toggled to a "down" position prompting the control system 306 to open the valve 310. As a consequence, the ram 40 (FIGS. 2, 13, 14 and 15) is relieved allowing a controlled descent to ground level of the platform P as illustrated in FIG. 1 by solid lines.

When the platform P attains the ground level position, the roll stop R lowers to the ramp position, as explained above, affording a smooth surface for transferring the wheelchair occupant from the platform P to the ground. To return the unloaded platform P to the stowage position, the mode switch 320 first is returned to the "stow" position. Next, the lift switch 324 is toggled to the "up" position again energizing the motor 308 actuating the pump 312 to extend the ram 40. Accordingly, as the platform P approaches stowage levels in the travelling assembly T, manual control is disabled with the level seeking switches 330 assuming control to align the travelling assembly T (FIG. 2). With the travelling assembly T so aligned, the stow switch 322 is toggled to the "in" position actuating the motor 132 to return the travelling unit to a stowed location. The clutch 118 sonically informs the operator when the travelling unit T is fully stowed. Thus, the operating cycle is complete.

In view of the above descriptions along with the drawings, it will be apparent that the system of the present invention affords an improved lift as for use with a vehicle to effectively and safely board and disembark persons in wheelchairs. It will be also appreciated that the unit is convenient in relation to the operation of the vehicle and relatively economical. Of course, numerous modifications to the lift will be apparent to those skilled in the art, accordingly, the scope hereof shall be deemed appropriately resolved by reference to the claims as set forth below.

What is claimed is:

1. A lift adapted to be affixed to a vehicle for movement of a load between raised and lowered positions, the lift comprising:

a platform structure for receiving the load to be moved between the raised and lowered positions;

a carriage structure pivotally coupled to said platform structure to accommodate a range of pivotal motion by said platform structure between said raised and lowered positions and embracing a stowage position existing intermediate said raised and lowered positions, said carriage structure including a first engaging member;

a mounting enclosure affixed to said vehicle and having a frame defining a space to receive at least part of said carriage structure and said platform structure, said mounting enclosure having a second engaging member for mounting encasement with said first engaging member;

a first motive means conditionally actuated for driving said platform structure in said pivotal range of motion;

a second motive means conditionally actuated for driving at least one of said first and second engaging members to move said carriage structure in and out of said mounting enclosure; and control apparatus for said first and second motive means, said control apparatus including a sensor unit detecting the platform structure substantially approaching said stowage position and said sensor unit being conditionally operative during select intervals to actuate said first motive means to adjust for alignment between said platform structure and said carriage for attaining said stowage position prior to said second motive means being actuated for drawing said carriage structure and at least part of said platform structure into said mounting enclosure.

2. A lift according to claim 1, wherein said sensor unit includes a switch means mounted for actuation with movement by said platform structure.

3. A lift according to claim 1, wherein said mounting enclosure further includes a pair of spaced-apart elongate channels in facing relationship for mounting elongate guide rails.

4. A lift according to claim 1, wherein said mounting enclosure further includes at least one cover extending between channels to close said mounting enclosure.

5. A lift according to claim 1, further comprising an elevating mechanism affixing said platform structure to said carriage structure and including at least one parallelogram mechanism.

6. A lift according to claim 5, wherein said parallelogram mechanism includes an elongate channel and an elongate rod affixed to extend in parallel between said platform structure and said carriage structure, said channel substantially enclosing said rod.

7. A lift according to claim 5, wherein said elevating mechanism further includes a cross bar affixed to extend between said parallelogram mechanisms and wherein said motive means includes means for displacing said cross bar in said motion pattern to raise and lower said platform structure.

8. A lift according to claim 5, wherein said parallelogram mechanism is unequal to angularly offset said platform structure from the horizontal as raised and lowered.

9. A lift according to claim 1, further comprising:
said second motive means actuating said carriage structure in and out of said mounting enclosure and wherein said first and second engaging members include a pair of spaced-apart rack and pinion gears.

10. A lift according to claim 1, further comprising:
a roll stop apparatus affixed to said platform structure at a location opposed to said vehicle and including:
a ramp member movable from a ground position extending from said platform structure to ground level and a somewhat vertical barrier position, said roll stop apparatus further including a roll stop motive means for moving said ramp member to said ground position when said platform structure is at ground level.

11. A lift according to claim 10, wherein said roll stop apparatus further comprises:
a latch mechanism locking said ramp member in a vertical position.

12. A lift according to claim 10, wherein said roll stop apparatus further comprises:
switch means to select an operating position of said roll stop.

13. A lift according to claim 10, wherein said roll stop apparatus further comprises:
a release mechanism for disengaging said roll stop motive means.

14. A lift according to claim 10, wherein said roll stop apparatus further comprises:
switch means to isolate selected movement of said platform structure unless said roll stop is in a selected position.

15. A lift according to claim 1, further comprising:
manual control means connected to said control apparatus for selectively energizing said first motive means and said second motive means.

16. A lift according to claim 1, wherein said first engaging member of said carriage structure includes spaced-apart first gear means and said second engaging member of said mounting enclosure includes spaced-apart second gear means for mounting engagement with said first gear means.

17. A lift according to claim 16, wherein said second motive means activating said gear means to move said carriage structure in and out of said mounting enclosure comprises a bi-directional motor.

18. A lift according to claim 16, wherein said spaced-apart first gear means includes a pair of pinions coupled to said motive means and said second gear means includes a pair of racks.

19. A lift according to claim 16, further including a shaft concentrically mounting said pinions and an arm structure for yieldably supporting said pinions in engagement with said racks.

20. A lift according to claim 1, wherein said mounting enclosure includes a pair of spaced-apart elongate guide rails, and said carriage structure includes cam followers for engaging said guide rails to facilitate movement of said carriage structure with reference to said mounting enclosure.

21. A lift according to claim 20, wherein said guide rails define an angle.

22. A lift according to claim 21, wherein said mounting enclosure further includes a pair of spaced-apart elongate channels in facing relationship for mounting said guide rails.

23. A lift according to claim 1, wherein said sensor unit senses positions of said platform structure and includes manual means controlled thereby to actuate said platform structure in said range of pivotal motion to a stowage position.

24. A lift according to claim 1, wherein guide rails are curved such that said platform structure changes its orientation to the ground as it moves in and out of said mounting enclosure.

* * * * *